United States Patent
Bajaj et al.

(10) Patent No.: US 11,321,981 B2
(45) Date of Patent: May 3, 2022

(54) TWO-FACTOR AUTHENTICATION SYSTEM (71) Applicant: Swiftlane, Inc., San Francisco, CA (US)

(72) Inventors: Saurabh Bajaj, San Francisco, CA (US); Sergej Pershaj, Minsk (BY); Nagesh Bhad, Solapur (IN)

(73) Assignee: Swiftlane, Inc., San Francisco, CA (US)

( * ) Notice: Subject to any disclaimer, the term of this patent is extended or adjusted under 35 U.S.C. 154(b) by 0 days.

(21) Appl. No.: 17/228,582

(22) Filed: Apr. 12, 2021

(65) Prior Publication Data

US 2021/0312734 A1    Oct. 7, 2021

Related U.S. Application Data

(63) Continuation of application No. 16/838,988, filed on Apr. 2, 2020, now Pat. No. 11,004,282.

(51) Int. Cl.
| | |
|---|---|
| *G05B 19/00* | (2006.01) |
| *G05B 23/00* | (2006.01) |
| *G06F 7/00* | (2006.01) |
| *G06F 7/04* | (2006.01) |
| *G06K 19/00* | (2006.01) |
| *G08B 29/00* | (2006.01) |
| *G08C 19/00* | (2006.01) |
| *H04B 1/00* | (2006.01) |
| *H04B 1/38* | (2015.01) |
| *H04B 3/00* | (2006.01) |
| *H04Q 1/00* | (2006.01) |
| *H04Q 9/00* | (2006.01) |
| *G07C 9/00* | (2020.01) |
| *G06T 7/40* | (2017.01) |
| *G06T 7/50* | (2017.01) |
| *H04L 9/14* | (2006.01) |

(Continued)

(52) U.S. Cl.
CPC ............ *G07C 9/00563* (2013.01); *G06T 7/40* (2013.01); *G06T 7/50* (2017.01); *G06V 40/172* (2022.01); *G06V 40/45* (2022.01); *H04L 9/14* (2013.01); *G06T 2207/10028* (2013.01); *G06T 2207/30088* (2013.01); *G06T 2207/30201* (2013.01)

(58) Field of Classification Search
CPC ......... G07C 9/00563; H04L 9/14; G06T 7/40; G06T 7/50; G06T 2207/30201; G06T 2207/10028; G06T 2207/30088; G06K 9/00288; G06K 9/00906
USPC ........................................................ 340/5.61
See application file for complete search history.

(56) References Cited

U.S. PATENT DOCUMENTS

| | | | |
|---|---|---|---|
| 2017/0185761 A1* | 6/2017 | Stanwood | H04L 9/0863 |
| 2018/0047227 A1* | 2/2018 | Beavers | G06F 21/40 |
| 2019/0318159 A1* | 10/2019 | Blanc-Paques | B60W 40/08 |

(Continued)

OTHER PUBLICATIONS

Tanmay K Shah, "Non-Final Office Action", dated Jan. 6, 2021, U.S. Appl. No. 16/838,988.

*Primary Examiner* — Tanmay K Shah
(74) *Attorney, Agent, or Firm* — LeonardPatel PC (57) ABSTRACT

A physical access control (PAC) system configured to perform a two-factor authentication prior to granting access to a secure area. The PAC system includes an access point device configured to perform facial recognition on a person proximate to the access point device, and perform wireless handshake with a mobile device associated with the person prior to granting or denying entry to the secure area.

18 Claims, 10 Drawing Sheets

(51) Int. Cl.
*G06V 40/40* (2022.01)
*G06V 40/16* (2022.01)

(56) References Cited

U.S. PATENT DOCUMENTS

2020/0082160 A1* 3/2020 Li ........................ G06K 9/6289
2020/0218887 A1* 7/2020 He ...................... G06K 9/00281

* cited by examiner

TWO-FACTOR AUTHENTICATION SYSTEM

CROSS-REFERENCE TO RELATED APPLICATION

This application is a continuation of, and claims priority to, U.S. application Ser. No. 16/838,988, filed on Apr. 2, 2020. The subject matter thereof is hereby incorporated herein by reference in its entirety.

FIELD

The present invention generally relates to a physical access control (PAC) system, and more specifically, to PAC system that uses a combination of facial recognition and mobile phone based verification to access a secure premise or location.

BACKGROUND

Most office and residential doors are secured and unlocked using keys or electronic key cards such as radio frequency identification (RFID) key cards or proximity cards. In these instances, a company admin assigns a badge (or a keycard) to employees. This keycard stores a certain identifier on it, which is mapped to a user. The person then walks up to a locked door, and presents the keycard to a keycard reader next to the door. The keycard reader verifies that identification number on the keycard, and if it's a registered number, the keycard reader unlocks the door for the user. This approach requires wireless RFID key cards.

This approach has several drawbacks. For example, the keycard readers can only verify whether a certain keycard is present. The keycard reader, however, cannot verify whether the authorized person is holding authorized keycard. For instance, if a keycard is stolen, an unauthorized person can gain unauthorized access to a secured room by holding the keycard to the keycard reader adjacent to the door. Further, there is no way to detect this unauthorized access, since the system trusts the keycard that is presented.

Another major drawback of keycards is that the 125 Khz proximity cards, which the most widely used format, are easily cloned or duplicated. For example, there exists off the shelf cloning devices that clone keycards. This means an unauthorized person can create copies of a valid keycard and gain unauthorized access to buildings.

Accordingly, an improved two-factor authentication system may be beneficial.

SUMMARY

Certain embodiments of the present invention may provide solutions to the problems and needs in the art that have not yet been fully identified, appreciated, or solved by current security system technologies. For example, some embodiments of the present invention pertain to a PAC system that uses facial recognition software and mobile phone based verification software to access secure spaces.

In an embodiment, PAC system configured to perform a two-factor authentication prior to granting access to a secure area. The PAC system includes an access point device configured to perform facial recognition on a person proximate to the access point device, and perform wireless handshake with a mobile device associated with the person prior to granting or denying entry to the secure area.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments generally pertain to a PAC system that uses facial recognition software and mobile phone based verification software to access secure premises. For purposes of explanation, the word 'secure premises' is not limited to a building or a room within a building, and may refer to any area that requires access. In an embodiment, the PAC system uses unique access control technology to provide a two-factor authentication solution for physical access to a secure premise. This two-factor authentication solution uses a combination of facial recognition software and wireless authentication software using a mobile phone. This PAC system is secure, since it requires the person's facial biometrics to be present, verifying the actual person instead of the keycard associated with the person. For purposes of explanation, the term "person" and "user" are used interchangeable without deviation in the meaning of the two terms.

Further, the PAC system requires the person to have login credentials to an authorized email. This allows the mobile device associated with the person to transmit a secure signature from an authenticated mobile application that the person is carrying. In one example, when a person walks up to a door, the person's mobile device detects the nearby access point device associated with the door. The mobile device may automatically perform a cryptographic wireless authentication over Bluetooth Low Energy (BLE) with the access point device. Next, when the person looks at the access point device, the access point device performs facial recognition to verify the identity of the person. When these two steps are performed together, the PAC system unlocks the door, granting access to the person (or now the "authorized user") to the secure premise.

In addition to performing a two-factor authentication, certain embodiments utilize an anti-spoofing technique. For example, with anti-spoofing, the access point device determines whether the person requesting access to the secure area is a real person.

The access point device may also check the identity of the person over multiple forms of authentication. For example, a mobile private key based check and a biometrics check are performed. In an embodiment, mobile device broadcasts its public key to the API server (e.g., unlock service server). Once the public key is broadcasted and transferred from API server to access point device, mobile device and access point device can perform BLE handshake so that the access point device can verify the identity of the mobile device.

The access point device also compares biometric data against a local facial signature in N dimensional space. For example, the access point device performs a k-nearest neighbors (KNN) algorithm to identify the face in N dimensional space and associate the face with the nearest cluster of face signature stored in the system.

Moreover, the access point device may learn and improve and average facial recognition signatures over time, thereby improving accuracy. The access point device, which includes a color camera and an infrared camera, captures 2D and 3D facial data to verify the identity of the person requesting access.

In certain embodiments, BLE handshake is defined as a method to authenticate a user's mobile device over BLE wireless connection. In an embodiment, the user's mobile device generates a private/public key pair, where the private key is securely stored on user's mobile device and never leaves the device. The public key, however, is securely synced to the access point device via the server (or unlock service server in some embodiments). The user's authentication on access point device is performed by way of a challenge solved by the user's mobile device using the user's mobile device's private key. The solved challenge may then be sent to access point device via BLE. In certain embodiments, the user device's private/public key pairs expire and auto-rotate after a predefined period of time to maximize security.

Figure 1:
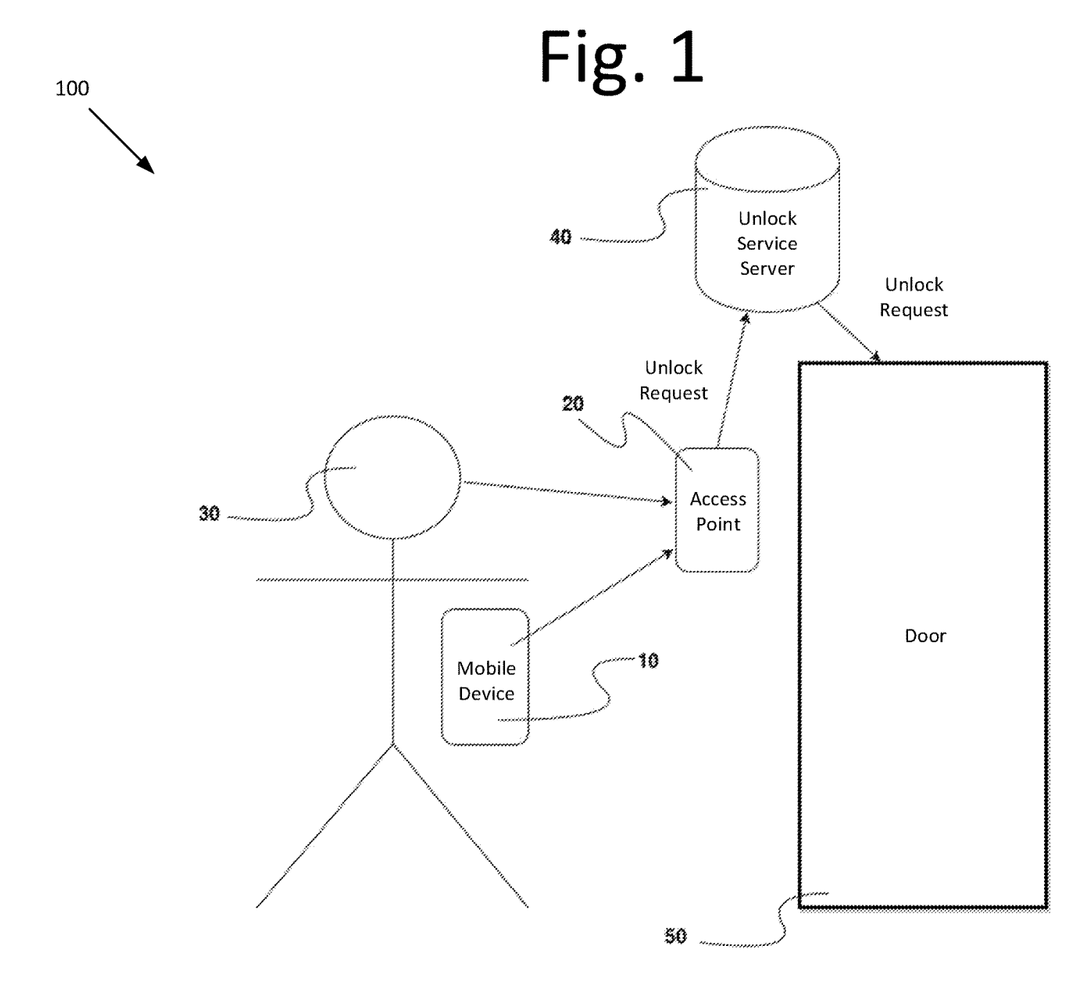
FIG. 1 is a block diagram illustrating a PAC system configured to perform two-factor authentication before allowing a person to access a building or a room within the building, according to an embodiment of the present invention.

FIG. 1 is a block diagram illustrating a PAC system 100 configured to perform two-factor authentication before allowing a person to access a secure premise (e.g., building or a room within the building), according to an embodiment of the present invention. In some embodiments, a person (or user) 30 may be carry a mobile device 10. For purposes of explanation, a user 30 may be defined as a human (or animal); who would otherwise like access to a secure premise. Mobile (or user) device 10 may be defined as a mobile phone, a tablet, a computer, a smart watch, a collar, a ring, or any other hardware device that can run software applications, and which supports BLE. Mobile device 10 may run a software application or firmware that performs handshakes over BLE protocol with access point device 20.

In some embodiments, access point device 20 is defined as a mobile phone, a tablet, a computer, a custom hardware device or any other device that can run custom software application(s) and/or custom firmware. Also, in some embodiments, access point device 20 performs BLE handshakes with mobile device 10.

In addition to performing BLE handshakes, access point device 20, which has a camera, may capture color and/or black and white images in both 2D and 3D. Both 2D and 3D images are collected, because checking both 2D and 3D images against system's database of 2D and 3D images provides redundancy, and is therefore more reliable in case one of the checks fails to give enough confidence. In an alternative embodiment, access point device 20 captures a video of the person. Capturing video of the person provides more information about person's facial movement in a natural environment. As a result, access point device 20 can determine liveness of the person by checking difference between video frames, i.e., checking eye movement and other facial features and how they relate to each other and change over time in a video. Eventually all checks allow for determining whether a person is live or whether it is a spoofing attack which is performed by presenting person's photo/video.

Continuing with the example of capturing 2D and 3D images, access point device 20 may capture 3D images, otherwise known as depth data (e.g., using an infrared camera), to run facial recognition and anti-spoofing software applications. Using an infrared camera allows access point device 20 to "see" in darkness. Color camera is useless in darkness as it cannot capture images without light. Along with ability to see in darkness, infrared camera allows projecting dots onto the face and producing accurate 3D depth map. By running facial recognition and anti-spoofing software applications, the person's 30 identity is verified. The applications may be executed locally on access point device 20, or in some other embodiments, access point device 20 may transmit the captured 2D images and 3D images to a remote server to verify the identity of user 30.

In certain embodiments, unlock service server 40 is defined as one of, or a combination of, the following: API server, hardware relay and any other device, configured to physically unlock of a door and/or turnstile, etc. Unlock service server 40 allows communication from access point device 20, i.e., to receive facial 2D and 3D depth data over an authenticated network call. Unlock service server 40 may also verify the person's identity, and perform additional checks, such as checking whether the user, who is trying to gain access, has the permission to gain access to the given entry way. Unlock service server 40 may also send a command to the hardware device to unlock the door (or secure entryway) 50, when a person is verified and allowed to access to door 50. Unlock service server 40 may also provide data to security teams over a network connection and a website user interface, so the security team can review the activity log of people that are attempting to gain access to door 50.

Door 50 may be defined as a physical door granting access to a secure premise within the building or any kind of a physical access to a secure area in or around the premise. For example, the door may be a turnstile, an elevator door, or any other mechanism that grants access to a secure premise.

In some embodiments, mobile device 10 continuously scans for nearby access points using BLE (e.g., even in background, while the mobile device is in person's pocket), and performs BLE handshakes with access point device 20 without user interaction.

Figure 3:
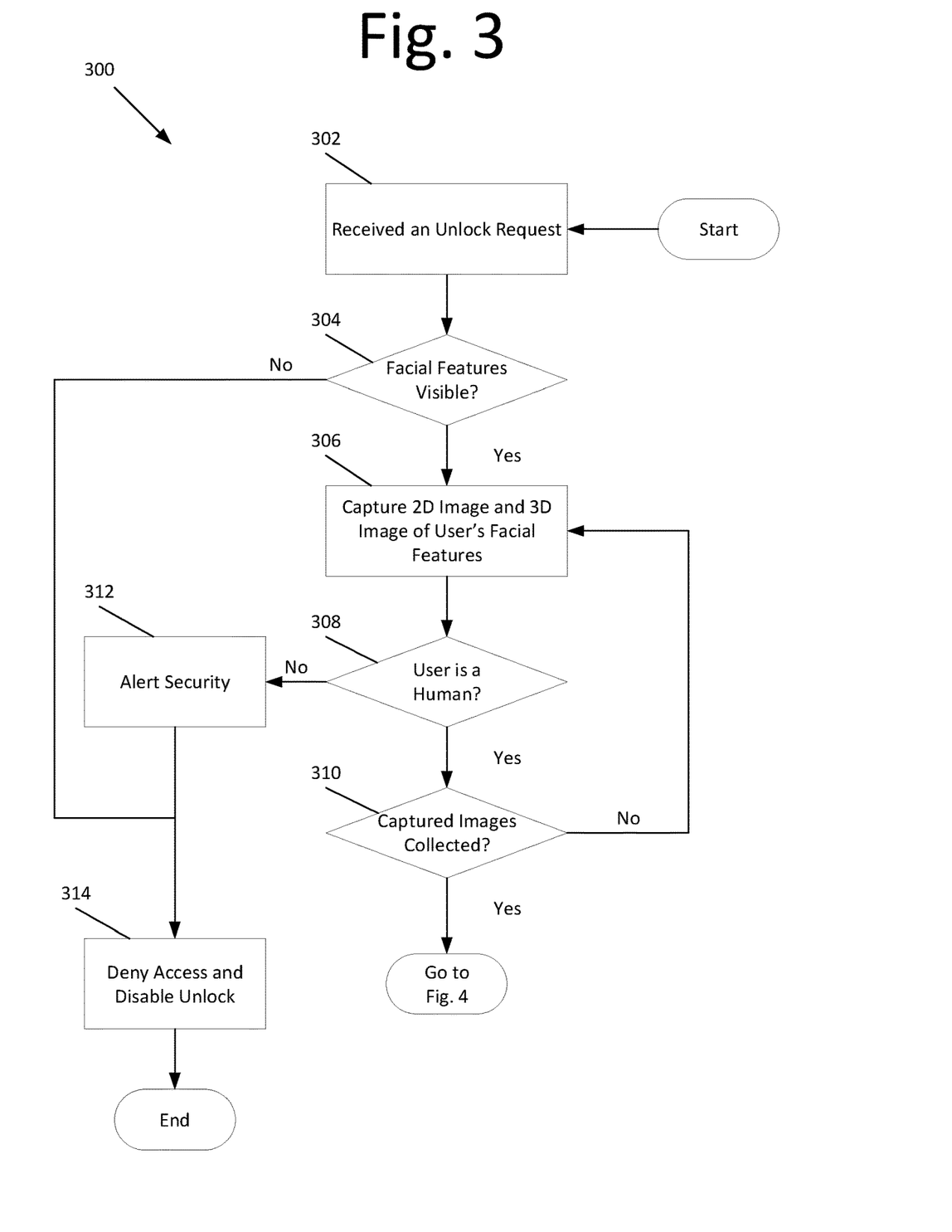
FIG. 3 is a flow diagram illustrating a process for capturing and collecting two-dimensional (2D) and three-dimensional (3D) images of the person, according to an embodiment of the present invention.

See, for example, FIG. 3, which is a flow diagram illustrating a process 300 for performing a two-factor authentication prior to granting access to a secure premise, according to an embodiment of the present invention. In some embodiments, process 300 begins at 302 with the access point device receiving an unlock request. The unlock request may be received when the unlock button on or near the access point device is pressed by the user. In an embodiment with a touchless unlock option, the unlock request may occur when the user's facial frames are collected by the access point device. For example, in such an embodiment, the user may stand in front of the camera, allowing the facial frames of the user to be captured.

In an alternative embodiment, access point device may continuously monitor for a wireless unlock request via BLE communication. In these embodiments, when a person with a mobile device walks near the access point device, which is attached to, or is proximate to, a door, the access point device may monitor or scan for a BLE signal. The user's mobile device may send an unlock request to the access point device, which is monitoring for the unlock request. The access point device receives the unlock request by way of BLE communication.

Regardless of the embodiment, when the unlock is requested, the access point device at 304 determines if the facial features of the person are visible. For example, the access point device checks to see if a fully visible face is in the view of the access point device's camera. If the facial features are not recognizable, the access point device at 314 denies access to the person and disables the unlock process.

If, however, the access point device determines that the facial features are visible, the access point device at 306 captures 2D and 3D images of the person's face. For example, a 2D color image and a 3D image (i.e., a 3D depth map) of the person's face is captured by the camera. The 3D depth map is a data structure that contains distance information from the viewpoint (in this case, the viewpoint is of an access point device's camera) to other objects in the real world that are visible within the camera's view. A specific example of a depth map would be an image (or multi-dimensional array) W×H, where 'W' is width in pixels, 'H' is height in pixels, and pixel value is the actual depth in meters (or other units of measure) from the camera's viewpoint to the 3D point in real world for which the particular pixel is associated with. As a result, the 3D model of the user's face is reconstructed using depth map values and is used to perform facial recognition and anti-spoofing. This approach also allows for the creation of a textured 3D model of a person's face by constructing 3D model using depth map and then applying the 2D color image captured by the color camera on top of 3D model. This enables sophisticated analysis to check for face match and anti-spoofing.

At 308, the access point device performs anti-spoofing to determine if the captured 2D and 3D images are of a human being. To determine if the 2D and 3D images are of a human being, the access point device checks the depth of the face from the captured 3D image at various points on the face. This allows the access point device to distinguish between a real person standing in front of the camera and a picture of a person placed in front of the camera. The access point device also scans for liveness of the face, i.e., looks at facial (e.g., eye and mouth movements) and body movements. In certain embodiments, the access point device analyzes the person's skin texture to determine liveness of the person.

If the access point device determines that the captured 2D and 3D images are not of a human being, then the access point device transmits an alert at 312 to security and disables the unlock procedure at 314. Otherwise, the process continues to 310. At 310, the access point device determines if the images are truly captured, i.e., checks to see if a plurality of color images and a plurality of 3D depth maps of the face are collected. If so, the process continues to step 402 of FIG. 4. Otherwise, the process returns to step 306 so the access point device can capture more 2D and 3D images.

Figure 4:
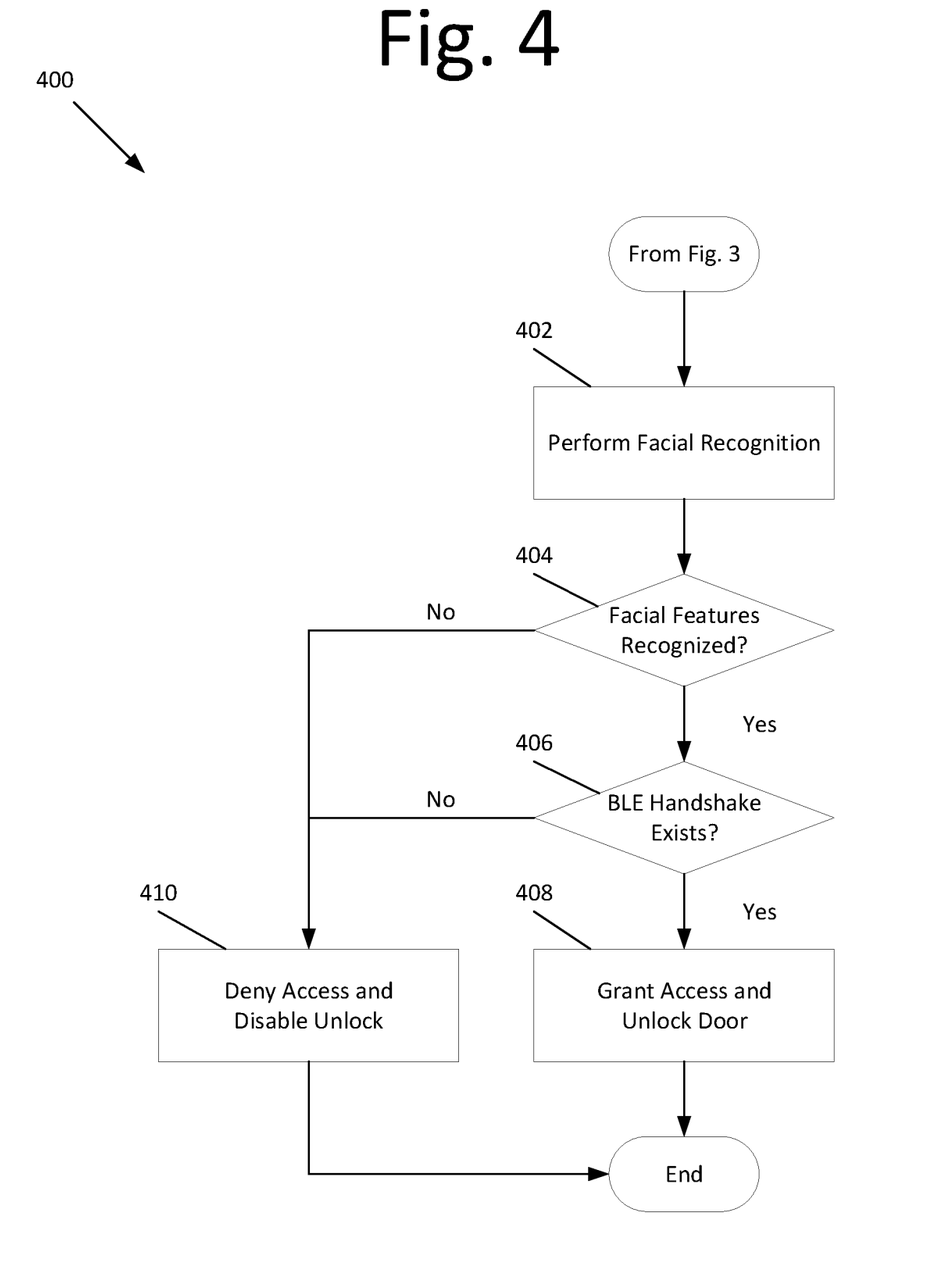
FIG. 4 is a flow diagram illustrating a process for performing facial recognition and BLE handshakes to grant access to a secured premise, according to an embodiment of the present invention.

FIG. 4 is a flow diagram illustrating a process 400 for performing facial recognition and BLE handshakes to grant access to a secured premise, according to an embodiment of the present invention. In some embodiments, process 400 may begin at 402 with the access point device performing facial recognition. To perform facial recognition, the access point device uses collected 2D and 3D images of the person. At 404, using the captured 2D and 3D images, the access point device performs a query to determine if the person's facial features are recognizable. The query may be performed by accessing the unlock service server, which may be a database that contains previously stored 2D and 3D images of the person attempting to access the secure premise.

If the facial features are not recognizable, then, at 410, the access point device disables the unlock process and denies access to the secured premises. If, however, the facial features of the person are recognizable, then, at 406, the access point device checks if there is existing BLE handshake with the user's mobile device to determine if the BLE handshake is valid. See, for example, FIGS. 6-9.

If a valid BLE handshake does not exist, the access point device at 410 disables the unlock process and denies access to the secured premises. If, however, a valid BLE handshake exists, the access point device at 408 unlocks the door and grants access to the secured premise.

Figure 2:
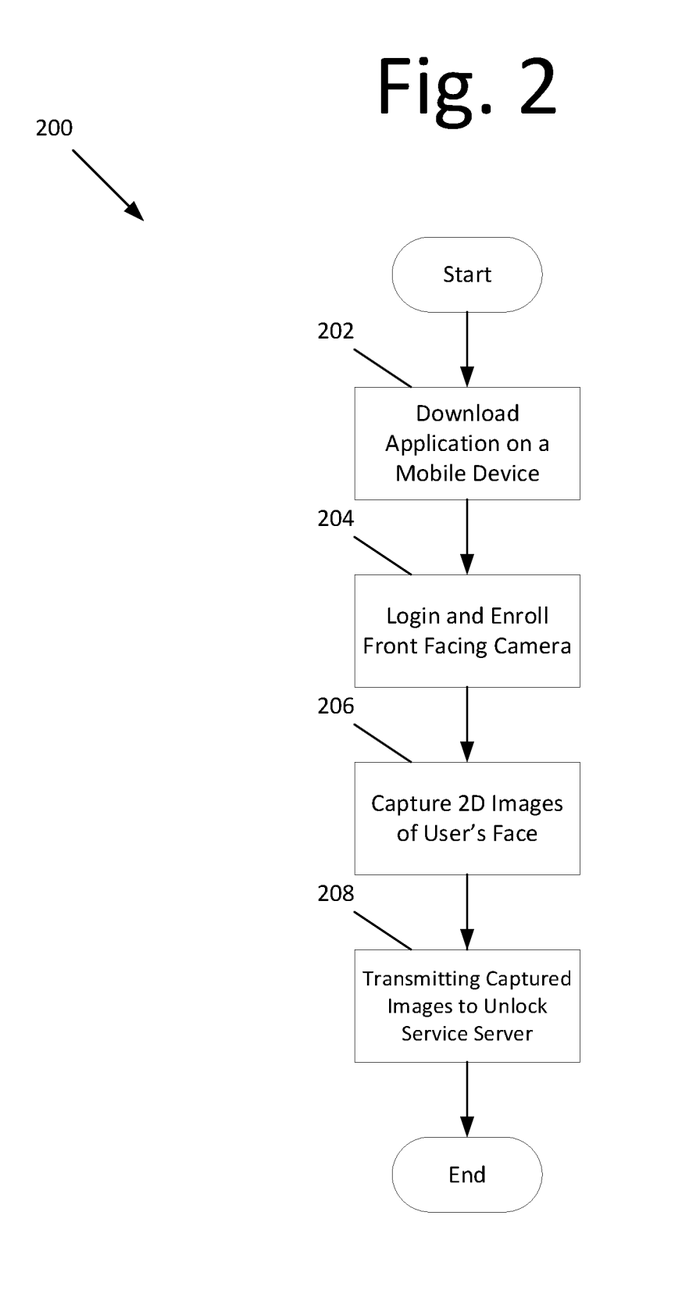
FIG. 2, which is a flow diagram illustrating a process for registering a user for the unlock service server, according to an embodiment of the present invention.

It should be noted that in order to carry out the process for two-factor authentication, it may be advisable to register each user. See, for example, FIG. 2, which is a flow diagram illustrating a process 200 for registering a user for the unlock service server, according to an embodiment of the present invention. In some embodiments, process 200 may begin at 202 with the mobile device downloading a two-factor authentication application. At 204, the two-factor authentication application is launched, allowing the user of the mobile device to login and enroll in the PAC system. During the enrollment process, the user of the mobile device uses the front camera to capture images of his or her face at 206. At 208, the captured 2D images are transmitted from the mobile device to the unlock service server to be stored therein. In some further embodiments, the public key of the user's mobile device is transmitted to the unlock service server. By enrolling in the PAC system, the access point device is able to compare captured 2D and 3D images of the user with the 2D images previously stored in the unlock service server.

Figure 5:
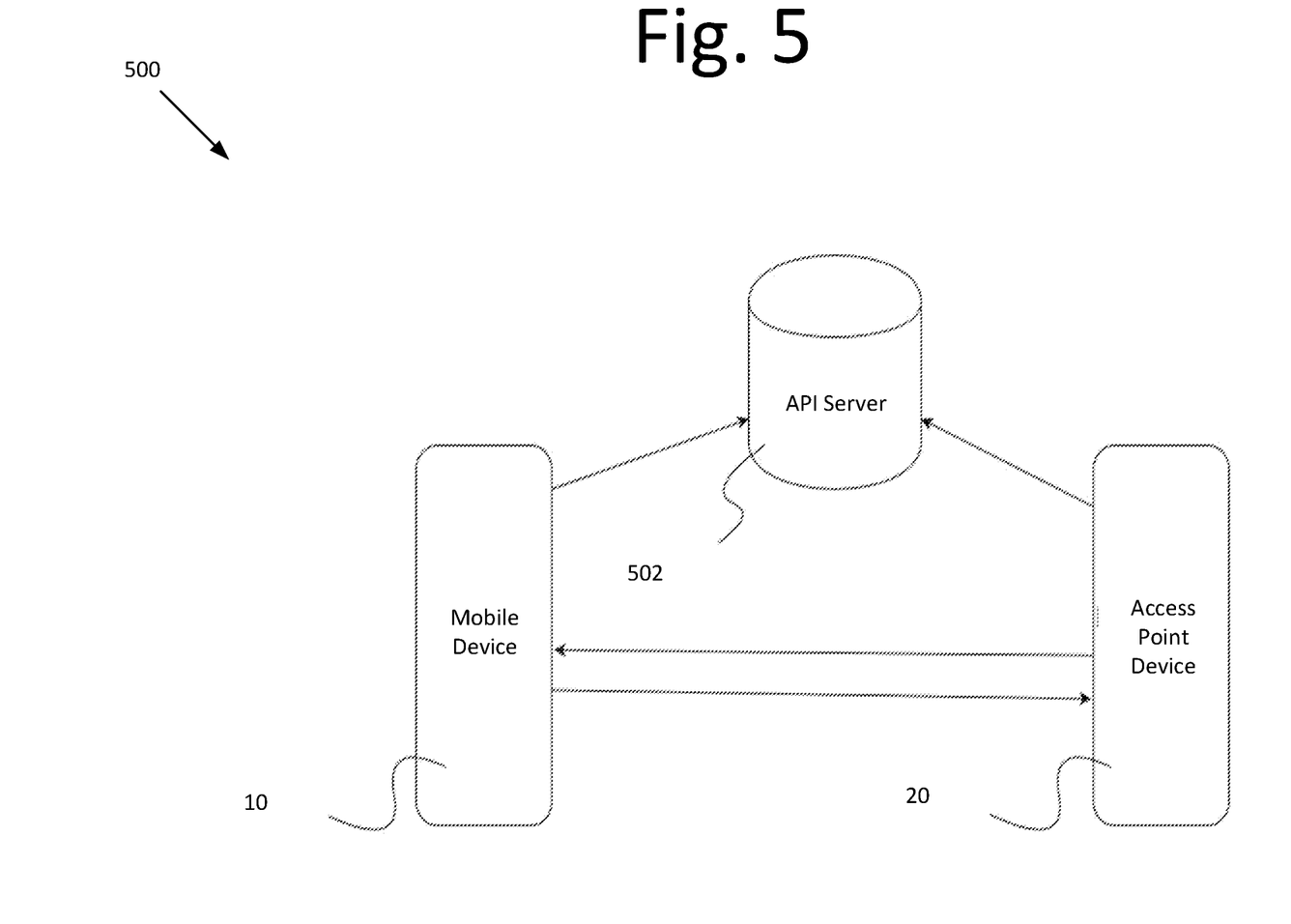
FIG. 5 is a block diagram illustrating a network communication architecture of the PAC system of FIG. 1, according to an embodiment of the present invention.

FIG. 5 is a block diagram illustrating a network communication architecture 500 of PAC system 100 of FIG. 1, according to an embodiment of the present invention. Network communication architecture 500 in this embodiment shows how a mobile device 10 and an access point device 20 are connected and how each device communicates with API server 502 and with each other. In some embodiments, API server 502 may be unlock service server 40, as shown in FIG. 1.

Depending on the embodiment, mobile device 10 or access point device 20 may be an handshake initiator. In embodiments where mobile device 10 is a handshake initiator, then access point device 20 is the handshake receiver. Otherwise, when access point device 20 is the handshake initiator, then mobile device 10 is the handshake receiver. In other words, both mobile device 10 and access point device 20 can initiate and complete a handshake over BLE.

API server 502 refers to server(s), which run a backend software that can securely receive a public key from the mobile device, e.g., by authenticating a user by username and password credentials or authentication tokens. API server 502 may then transfer (either directly or by means of third party services) the public key to access point device in real time.

It should be appreciated that there are two (2) types of BLE handshake—a timestamp-based handshake and a random challenge-based handshake.

Prerequisites for both timestamp-based handshake and random challenge-based handshake include one or more of the following: (1) the mobile device 10 generates a public-private key pair and securely uploads public key to API server 502; (2) access point device receives the public key from API server 502 in real-time; and (3) the mobile device 10 continuously scans for nearby BLE devices independently on whether it is in foreground or background state (no user interaction required). In an alternative embodiment, the access point device 20 may continuously scan for nearby BLE devices.

Timestamp-Based Bluetooth Low Energy Handshake

Figure 6:
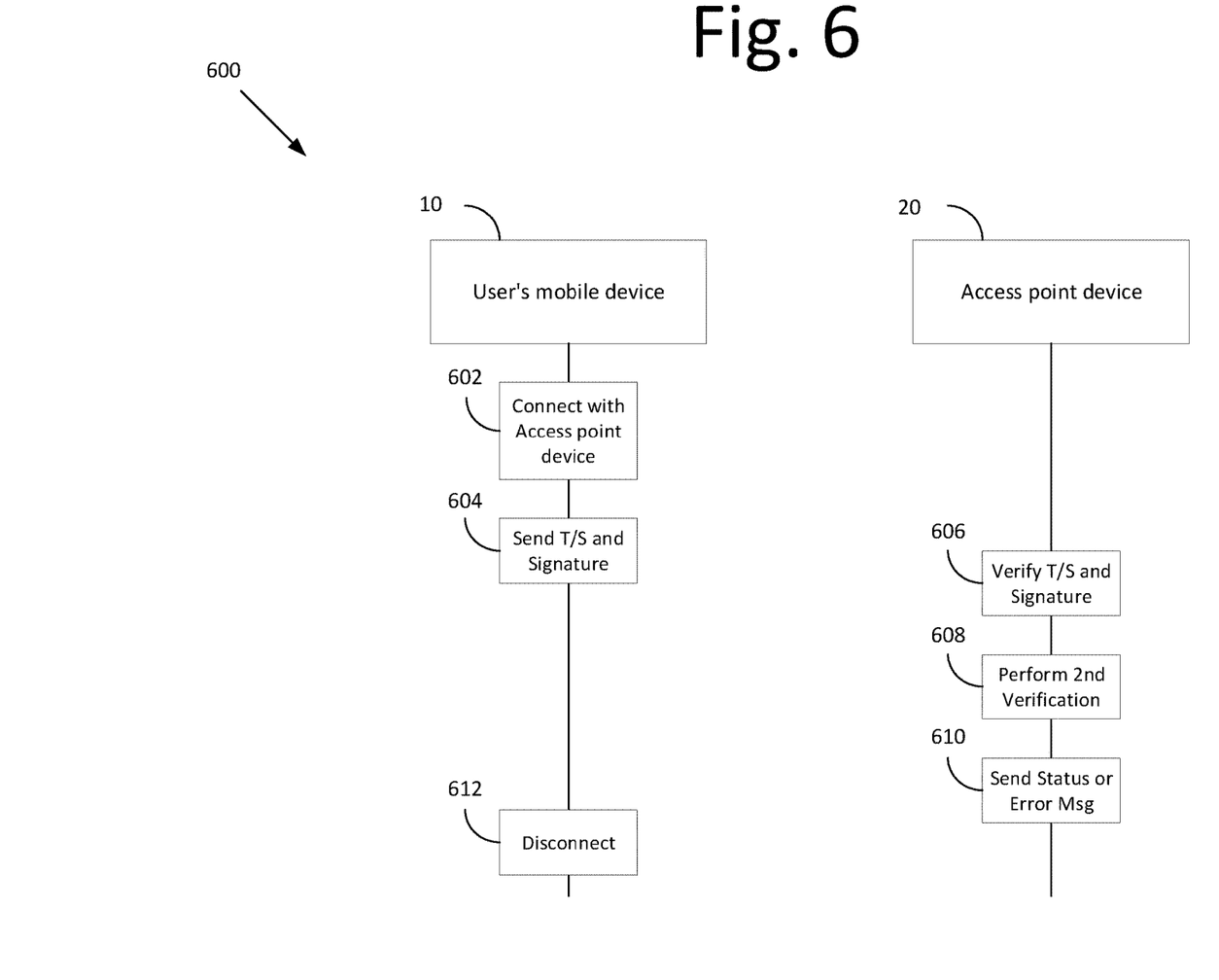
FIG. 6 is a flow diagram illustrating a process for executing a timestamp-based Bluetooth low energy handshake when the mobile device is the handshake initiator, according to an embodiment of the present invention.

FIG. 6 is a flow diagram illustrating a process 600 for executing a timestamp-based Bluetooth low energy handshake when mobile device 10 is the handshake initiator, according to an embodiment of the present invention. In some embodiments, process 600 begins at 602 with mobile device 10 (handshake initiator) discovering and connecting with access point device 20 (handshake receiver). At 604, mobile device 10 sends a current timestamp and its cryptographic signature generated by mobile device private key to access point device 20. In certain embodiments, mobile device 10 may also send metadata such as user identification (ID).

At 606, access point device 20 verifies received timestamp and the cryptographic signature using all known valid user public keys. All known valid user public keys may be found in API server (see FIG. 5), all of which were previously uploaded by mobile device 10. If timestamp signature corresponds to one of those keys, then the signature is valid. Otherwise, the process ends.

At 608, access point device 20 performs a second verification. In this second verification, access point device 20 verifies the timestamp value against the current timestamp. In an embodiment, access point device 20 may verify whether the timestamp is within a predefined period of time, both in the past and in the present. Access point device 20 also verifies whether the timestamp value has been used prior to this verification step. If timestamp signature is valid and timestamp hasn't been used before and is within a pre-defined, acceptable time window, then the handshake is considered completed and valid.

At 610, access point device 20 then sends a handshake status or an error message (if invalid) to mobile device 10. The handshake status indicates whether the handshake is valid. At 612, mobile device 10 disconnects from access point device 20.

It should be appreciated that depending on the embodiment, process 600 may be repeated as the handshake has an expiration time. For example, depending on the set expiration time, mobile device 10 may connect to access point device 20 and perform the steps outlined in process 600 of FIG. 6.

Figure 7:
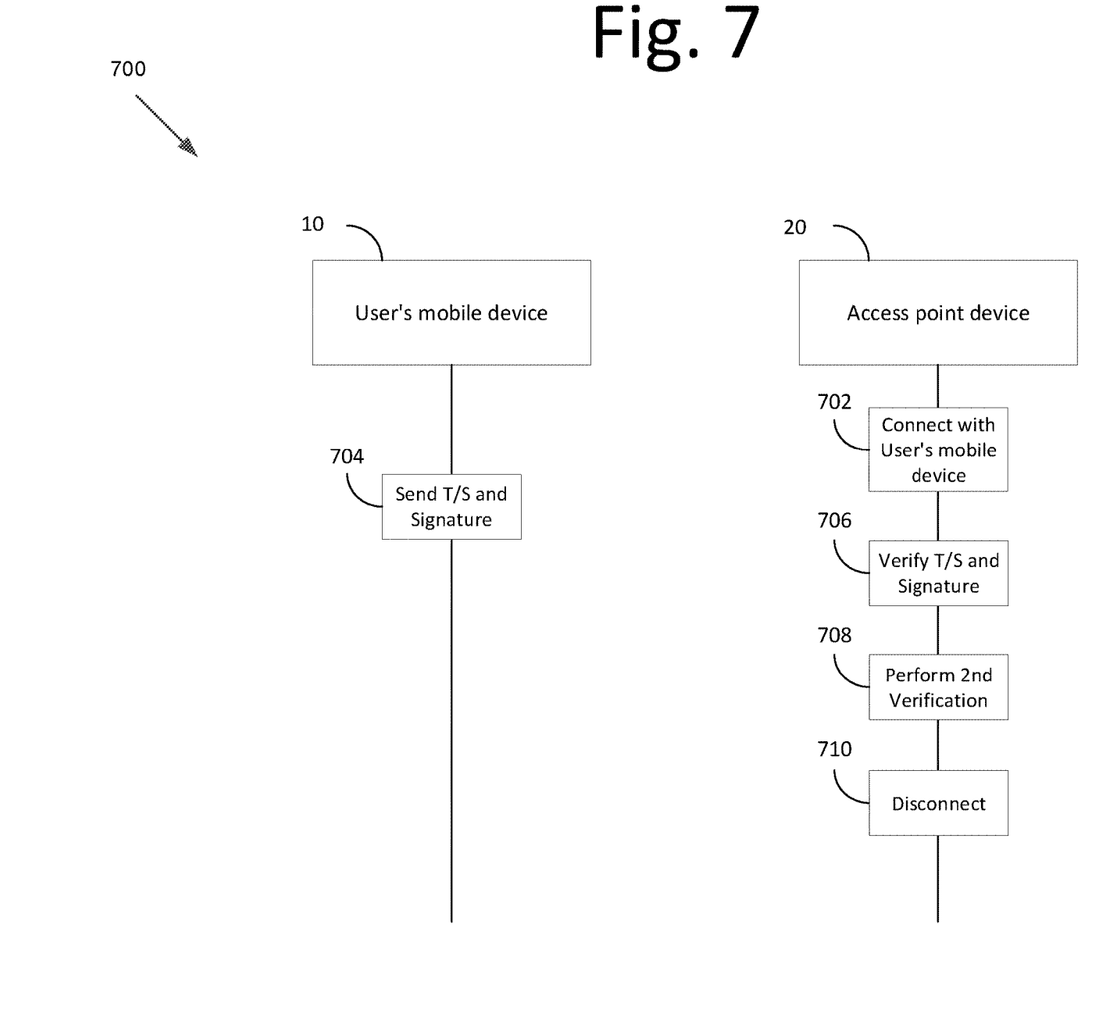
FIG. 7 is a flow diagram illustrating a process for executing a timestamp-based Bluetooth low energy handshake when the access point device is the handshake initiator, according to an embodiment of the present invention

FIG. 7 is a flow diagram illustrating a process 700 for executing a timestamp-based Bluetooth low energy handshake when access point device 20 is the handshake initiator, according to an embodiment of the present invention. In some embodiments, process 700 begins at 702 with access point device 20 (handshake initiator) discovering and connecting with mobile device (handshake receiver). At 704, upon connecting with access point device 20, mobile device 10 automatically sends a current timestamp and cryptographic signature of current timestamp generated by mobile device 10 private key to access point device 20. In alternative embodiments, the mobile device 10 may request authorization from the user to send the current timestamp and cryptographic signature to access point device 20. Further, in some embodiments, mobile device 10 may also send metadata such as user identification (ID).

At 706, access point device 20 verifies received timestamp and the cryptographic signature using all known valid user public keys. All known valid user public keys may be found in API server (see FIG. 5), all of which were previously uploaded by mobile device 10. If timestamp signature corresponds to one of those keys, then the signature is valid. Otherwise, the process ends.

At 708, access point device 20 performs a second verification. In this second verification, access point device 20 verifies the timestamp value against the current timestamp. In an embodiment, access point device 20 may verify whether the timestamp is within a predefined period of time, both in the past and in the present. Access point device 20 also verifies whether the timestamp value has been used prior to this verification step. If timestamp signature is valid and timestamp hasn't been used before and is within a pre-defined, acceptable time window, then the handshake is considered completed and valid.

At 710, access point device 20 disconnect from mobile device 10. In certain embodiments, prior to disconnecting, access point device 20 may send a handshake status or an error message (if invalid) to mobile device 10.

It should be appreciated that depending on the embodiment, process 700 may be repeated as the handshake has an expiration time. For example, depending on the set expiration time, access point device 20 may connect to mobile device 10 and perform the steps outlined in process 700 of FIG. 7.

Random Challenge-Based Bluetooth Low Energy Handshake

Figure 8:
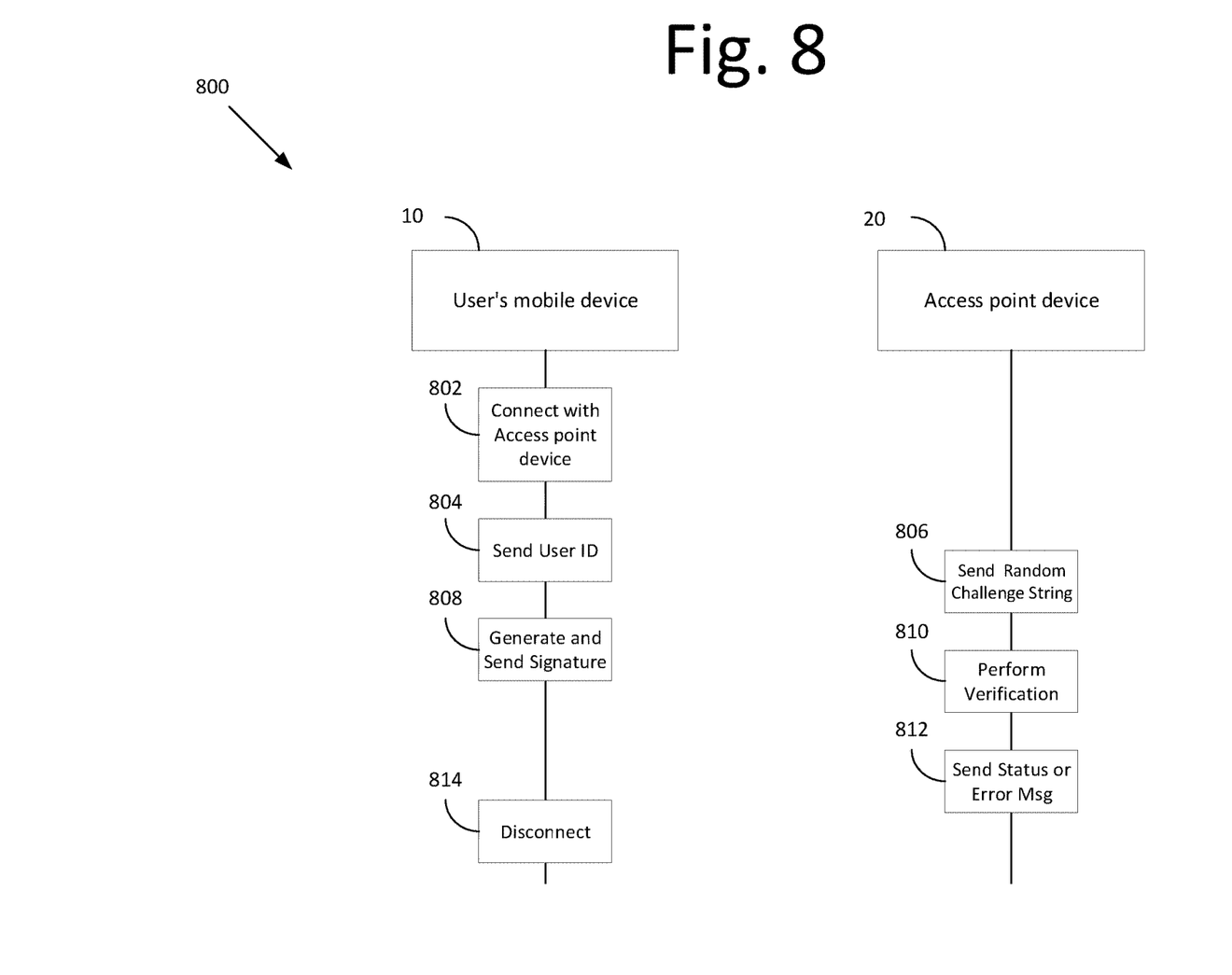
FIG. 8 is a flow diagram illustrating a process for executing a random challenge-based BLE handshake when the mobile device is the handshake initiator, according to an embodiment of the present invention.

FIG. 8 is a flow diagram illustrating a process 800 for executing a random challenge-based BLE handshake when mobile device 10 is the handshake initiator, according to an embodiment of the present invention. In some embodiments, process 800 may begin with mobile device 10 (handshake initiator) discovering and connecting to access point device 20 (handshake receiver) at 802. At 804, mobile device 10 sends user ID to access point device 20, and in response, access point device 20 sends a random challenge string (UUID) to mobile device 10 at 806.

At 808, mobile device 10 generates a cryptographic signature for the random challenge string received from access point device 20 and sends the cryptographic signature to access point device 20. In some embodiments, the cryptographic signature may include a hash of the challenge, as cryptographically signed by the user's private key. This hash or cryptographic signature can only be generated by the user's mobile device, which holds the private key. Mobile device 10 may also send the original random challenge string, in some embodiments. At 810, access point device 20 verifies the signature of the random challenge string received from mobile device 10 using a public key associated with mobile device 10. In some embodiments, access point device 20 retains a local copy of the public keys associated with the users of the system. Access point device 20 also receives those keys from the unlock service server for all users. These keys are originally sent from the users, from their mobile devices, during the process of enrollment into the unlock service server.

If the cryptographic signature is correct and random challenge string is equivalent to the one that was originally sent from access point device 20 to mobile device 10, then the handshake is considered completed and valid. In one example, the access point device 20 may verify the received data, by checking the hash/cryptographic signature that is generated by encoding the challenge string, with the user's private key. Only the holder of the private key may generate this unique hash for the challenge string, whereas anyone who has access to the corresponding public key can verify whether the challenge was truly hashed by the private key. At 812, access point device 20 sends the handshake status or an error message to mobile device 10. In some embodiments, the handshake status indicates whether handshake is valid. If the handshake is not valid, mobile device 10 receives an error message. At 814, mobile device 10 disconnects from access point device 20.

In certain embodiments, process 800 may be repeated, since the handshake has an expiration time. For example, depending on the set expiration time, mobile device 10 connects to access point device 20 and perform the steps in process 800 again.

Figure 9:
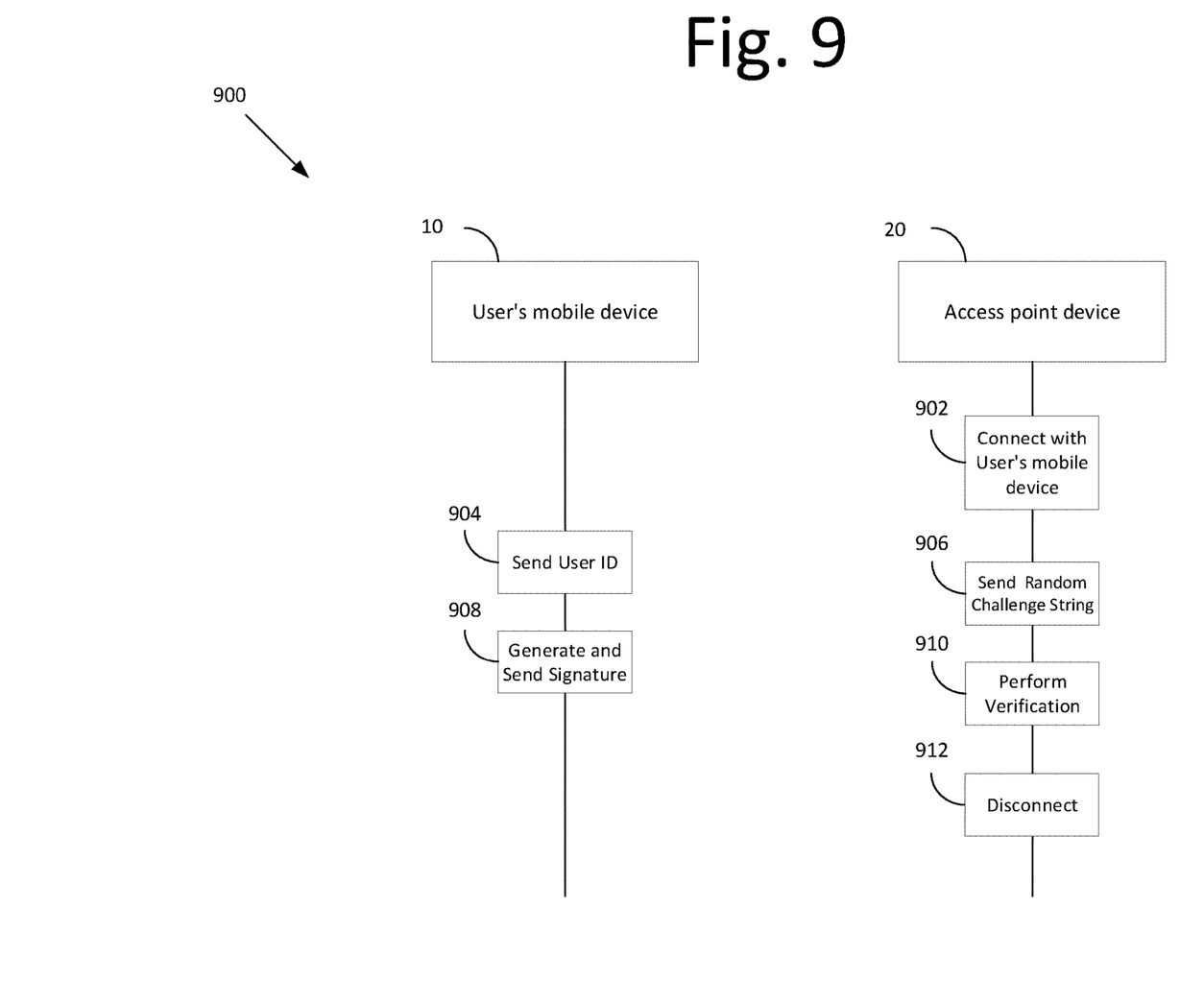
FIG. 9 is a flow diagram illustrating a process for executing a random challenge-based BLE handshake when the access point device is the handshake initiator, according to an embodiment of the present invention.

FIG. 9 is a flow diagram illustrating a process 900 for executing a random challenge-based BLE handshake when access point device 20 is the handshake initiator, according to an embodiment of the present invention. In some embodiments, process 900 may begin with access point device 20 (handshake initiator) discovering and connecting to mobile device 10 (handshake receiver) at 902. At 904, mobile device 10 sends user ID to access point device 20, and in response, access point device 20 sends a random challenge string (UUID) to mobile device 10 at 906.

At 908, mobile device 10 generates a cryptographic signature for the random challenge string received from access point device 20 and sends the cryptographic signature to access point device 20. In some embodiments, the cryptographic signature may include a hash of the challenge, as cryptographically signed by the user's private key. This hash or cryptographic signature is generated by mobile device 10, which holds the private key. Mobile device 10 may also send the original random challenge string, in some embodiments. At 910, access point device 20 verifies the signature of the random challenge string received from mobile device 10 using a public key associated with mobile device 10. In some embodiments, access point device 20 retains a local copy of the public keys associated with the users of the system. Access point device 20 also receives those public keys from the unlock service server for all users. These public keys are originally sent from the users, from their mobile devices, during the process of enrollment into the unlock service server.

If the cryptographic signature is correct and random challenge string is equivalent to the one that was originally sent from access point device 20 to mobile device 10, then the handshake is considered completed and valid. In one example, the access point device 20 may verify the received data, by checking the hash/cryptographic signature that is generated by encoding the challenge string, with the user's private key. Only the holder of the private key may generate this unique hash for the challenge string, whereas anyone who has access to the corresponding public key can verify whether the challenge was truly hashed by the private key. At 912, access point device 20 disconnects from mobile device 10. In some additional embodiments, access point device 20, prior to disconnecting with mobile device 10, sends the handshake status or an error message to mobile device 10. In those embodiments, the handshake status indicates whether handshake is valid. If the handshake is not valid, mobile device 10 receives an error message.

In certain embodiments, process 900 may be repeated, since the handshake has an expiration time. For example, depending on the set expiration time, access point device 20 connects to mobile device 10 and perform the steps in process 900 again.

Figure 10:
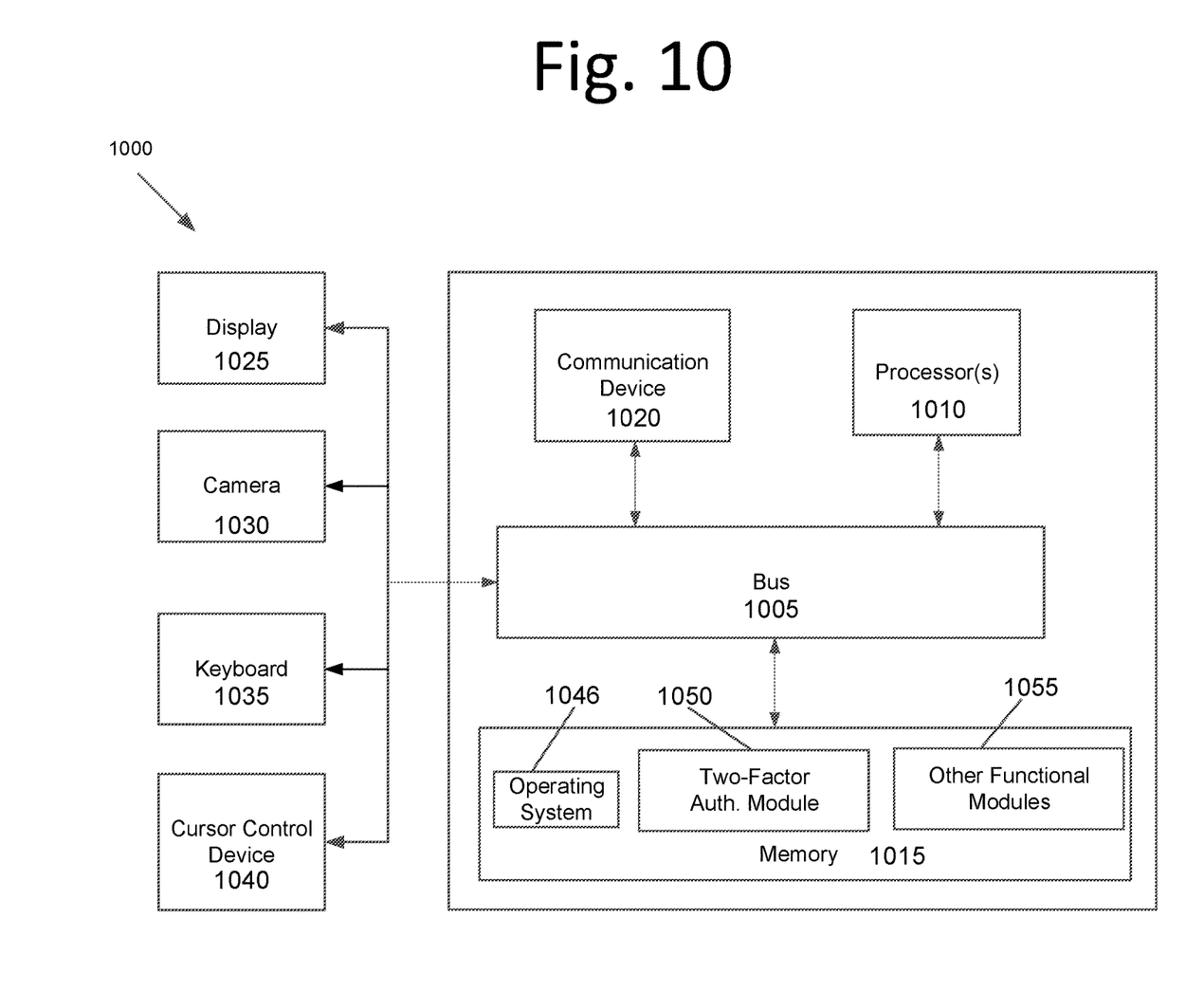
FIG. 10 is an architectural diagram illustrating a computing system configured to perform two-factor authentication of a person and his or her mobile device, according to an embodiment of the present invention.

FIG. 10 is an architectural diagram illustrating a computing system 1000 configured to perform two-factor authentication of a person and his or her mobile device, according to an embodiment of the present invention. In some embodiments, computing system 1000 may be one or more of the computing systems (access point device and/or API service) depicted and/or described herein. Computing system 1000 includes a bus 1005 or other communication mechanism for communicating information, and processor(s) 1100 coupled to bus 1005 for processing information. Processor(s) 1010 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 1010 may also have multiple processing cores, and at least some of the cores may be configured to perform specific functions. Multi-parallel processing may be used in some embodiments.

Computing system 1000 further includes a memory 1015 for storing information and instructions to be executed by processor(s) 1010. Memory 1015 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 1010 and may include volatile media, non-volatile media, or both. The media may also be removable, non-removable, or both.

Additionally, computing system 1000 includes a communication device 1020, such as a transceiver or a receiver and transmitter, to provide access to a communications network via a wireless and/or wired connection. In some embodiments, communication device 1020 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 1020 may include one or more antennas that are singular, arrayed, phased, switched, beamforming, beamsteering, a combination thereof, and or any other antenna configuration without deviating from the scope of the invention.

Processor(s) 1010 are further coupled via bus 1005 to a display 1025, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 1025 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

Processor(s) 1010 is also coupled to a camera 1030 configured to capture audio, images, and/or video of a person. Camera 1030 may include an infrared camera module configured to capture 3D depth data of the person. A keyboard 1035 and a cursor control device 1040, such as a touchpad, etc., are further coupled to bus 1005 to enable a user to interface with computing system 1000. However, in certain embodiments, a physical keyboard and cursor unit may not be present, and the user may interact with the device solely through display 1025 and/or a touchpad (not shown). Any type and combination of input devices may be used as a matter of design choice. In certain embodiments, no physical input device and/or display is present. For instance, the user may interact with computing system 1000 remotely via another computing system in communication therewith, or computing system 1000 may operate autonomously.

Memory 1015 stores software modules that provide functionality when executed by processor(s) 1010. The modules include an operating system 1045 for computing system 1000. The modules further include a two-factor authentication module 1050 configured to perform all, or part of the processes described herein or derivatives thereof. Computing system 1000 may include one or more additional functional modules 1055 that include additional functionality such as BLE handshake verification.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIGS. 2-4, and 6-9 may be performed by a computer program, encoding instructions for the processor(s) to perform at least part of the process(es) described in FIGS. 2-4, and 6-9, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 1010 of computing system 1000 of FIG. 10) to implement all or part of the process steps described in FIGS. 2-4, and 6-9, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

Some embodiments generally pertain to maximizing security of a PAC system by requiring both knowledge and biometrics factors to be present at the same time. If one of these factors is not present, the PAC system will deny access. This makes it impossible for an unauthorized person to steal the user's password and enter the secure premise. It will also not be possible to hack the facial recognition system by only using photo/video/3D mask based attacks, since the access point device will not grant access without the correct credentials on the user's mobile device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An access point device configured to perform a two-factor authentication prior to granting access to a secure area, comprising:
   memory comprising a set of instructions; and
   at least one processor, wherein
   the set of instructions and the at least one processor are configured to
      perform facial recognition on a person proximate to the access point device, and perform wireless handshake with a mobile device associated with the person, prior to granting or denying entry to the secure area; and
      when the access point device is a handshake initiator, the set of instructions and the at least one processor are configured to connect with the mobile device and receive a timestamp and a cryptographic signature from the mobile device.

2. The access point device of claim 1, wherein the set of instructions and the at least one processor are further configured to receive an unlock request from the mobile device associated with a person.

3. The access point device of claim 2, further comprising:
   a camera is configured to scan facial features of the person, allowing the set of instructions and the at least one processor to determine if the facial features are visible.

4. The access point device of claim 3, wherein the set of instructions and the at least one processor are further configured to
   store a plurality of 2-dimensional (2D) images and a plurality of 3-dimensional (3D) images of the person captured by the camera, and
   perform anti-spoofing to determine if the plurality of captured 2D images and the plurality of 3D images are of a live person.

5. The access point device of claim 4, wherein
   the plurality of captured 3D image is a 3D depth map of the person's face captured by the camera, and
   the 3D depth map is a data structure that comprises of distance information from a viewpoint of the camera to the person in front of the camera.

6. The access point device of claim 4, wherein the set of instructions and the at least processor are further configured to check a depth of the person's face from the plurality of captured 3D images at various points on the face.

7. The access point device of claim 4, wherein the set of instructions and the at least one processor further configured to scan for liveness of the face and analyze the person's skin texture to determine liveness of the person.

8. The access point device of claim 4, wherein the set of instructions and the at least one processor are further configured to compare the plurality of captured 2D images and the plurality of captured 3D images against previously stored 2D images and 3D images to perform facial recognition of the person requesting access to the secured area.

9. The access point device of claim 1, wherein the set of instructions and at least one processor are further configured to perform the wireless handshake with the mobile device to determine if a valid wireless handshake exists between the access point device and the mobile device.

10. The access point device of claim 1, wherein, when the access point device is the handshake initiator, the set of instructions and the at least one processor are further configured to verify or validate the timestamp and the cryptographic signature using one of the plurality of valid public keys previously stored in unlock service server.

11. The access point device of claim 1, when the access point device is the handshake initiator, the set of instructions and the at least one processor are further configured to verify or validate a current timestamp of the access point against the timestamp received from the mobile device, and when the timestamp received from the mobile device is within a predefined period of time, both in past and in present, the handshake is valid.

12. The access point device of claim 1, wherein, when the access point device is a handshake initiator, the set of instructions and the at least one processor are further configured to connect to, and receive a user identification (ID) from, the mobile device.

13. The access point device of claim 12, wherein, when the access point device is the handshake initiator, the set of instructions and the at least one processor are further configured to transmit a random challenge string to the mobile device, thereby causing the mobile device to generate a cryptographic signature for the random challenge string, the cryptographic signature generated by a private key residing on the mobile device and comprising a hash of the random challenge string.

14. The access point device of claim 13, wherein, when the access point device is the handshake initiator, the set of instructions and the at least one processor are further configured to receive the cryptographic signature from the mobile device and verify or validate the cryptographic signature using one of the plurality of valid public keys previously stored in unlock service server.

15. A mobile device used to gain access to a secure area, comprising:
   memory comprising a set of instructions; and
   at least one processor, wherein the set of instructions and the at least one processor are configured to
   generate a public key synced with an access point device by way of an unlock service server, allowing for a wireless handshake between the mobile device and the access point device, and
   generate a private key securely stored within the mobile device;
   wherein, when the mobile device is a handshake initiator, the set of instructions and the at least one processor are configured to connect with the access point device and send a current timestamp and a cryptographic signature generated by the private key to the access point device.

16. The mobile device of claim 15, wherein, when the mobile device is a handshake initiator, the set of instructions and the at least one processor are further configured to connect to, and send a user identification (ID) to, the access point device.

17. The mobile device of claim 16, wherein, when the mobile device is the handshake initiator, the set of instructions and the at least one processor are further configured to receive a random challenge string generated by the access point device and generate a cryptographic signature for the random challenge string,
   the cryptographic signature generated by a private key resides on the mobile device and comprises a hash of the random challenge string.

18. The mobile device of claim 17, wherein, when the mobile device is the handshake initiator, the set of instructions and the at least one processor are further configured to transmit the cryptographic signature to the access point device, thereby causing the access point device to verify or validate the cryptographic signature using one of the plurality of valid public keys previously stored in unlock service server.

* * * * *